(12) United States Patent
Johnson et al.

(10) Patent No.: US 9,662,999 B2
(45) Date of Patent: May 30, 2017

(54) VEHICLE COMPRISING A UTILITY SPACE

(71) Applicant: VOLVO CAR CORPORATION, Gothenburg (SE)

(72) Inventors: Tisha Johnson, Camarillo, CA (US); Todd Levy, Gothenburg (SE); Patrik Lundgren, Torslanda (SE); Axel Ernstsson, Gothenburg (SE); Thomas Christiansson, Askim (SE); Robin Page, Vastra Frolunda (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 15/078,152

(22) Filed: Mar. 23, 2016

(65) Prior Publication Data

US 2016/0288667 A1    Oct. 6, 2016

(30) Foreign Application Priority Data

Apr. 1, 2015    (EP) .................................... 15162219

(51) Int. Cl.
*B60R 11/06*      (2006.01)
*B60N 2/01*       (2006.01)
(Continued)

(52) U.S. Cl.
CPC ................. *B60N 2/01* (2013.01); *B60N 3/06* (2013.01); *B60N 3/104* (2013.01); *B60R 7/04* (2013.01);
(Continued)

(58) Field of Classification Search
CPC ........ B60N 2/305; B60N 2/36; B60N 2/3011; B60N 2/3013; B60N 2/01; B60N 3/06;
(Continued)

(56) References Cited

U.S. PATENT DOCUMENTS

| | | | | |
|---|---|---|---|---|
| 4,917,433 A | * | 4/1990 | Tomforde | B60J 5/0455 296/146.5 |
| 5,478,126 A | * | 12/1995 | Laesch | E05C 19/06 292/87 |

(Continued)

FOREIGN PATENT DOCUMENTS

| | | |
|---|---|---|
| CN | 101712286 A | 5/2010 |
| CN | 101875320 A | 11/2010 |
| GB | 1290187 A | 9/1972 |

OTHER PUBLICATIONS

Extended European Search Report Dated Sep. 30, 2015, Application No. 15162219.8-1754, Applicant Volvo Car Corporation, 6 Pages.

*Primary Examiner* — Kiran B Patel
(74) *Attorney, Agent, or Firm* — Brooks Kushman P.C.

(57) ABSTRACT

The disclosure relates to a vehicle comprising a front seat section and a rear seat section. The front seat section comprises a driver seat and a utility space located at the side of the driver seat. The rear seat section comprises multiple seats and rear doors on either side of the rear seat section. The front seat section comprises a single front door comprising a front door surface at the side of the front seat section adjacent the driver seat, and a fixed surface element located at the opposite side of the front seat section facing towards the front door surface of the single front door, such that the utility space comprises the fixed surface element. The utility space is accessible to a person sitting in the rear seat section.

9 Claims, 3 Drawing Sheets

(51) Int. Cl.
  *B60R 7/04*   (2006.01)
  *B60N 3/06*   (2006.01)
  *B60N 3/10*   (2006.01)
  *B60R 7/08*   (2006.01)
  *B60R 11/02*  (2006.01)

(52) U.S. Cl.
  CPC .............. *B60R 7/085* (2013.01); *B60R 11/02* (2013.01); *B60R 2011/0276* (2013.01)

(58) Field of Classification Search
  CPC .... B60N 3/104; B62D 47/003; B62D 23/005; B62D 33/0273; B60P 3/423; B60R 7/04; B60R 7/085; B60R 11/02; B60R 2011/0276
  USPC ........................ 296/37.8, 183.1, 183.2, 24.43
  See application file for complete search history.

(56) References Cited

U.S. PATENT DOCUMENTS

| | | | | |
|---|---|---|---|---|
| 5,613,723 A * | 3/1997 | Laesch | ................ | B60R 7/04 16/341 |
| 5,848,820 A * | 12/1998 | Hecht | ................ | B60N 2/3013 297/113 |
| 6,880,874 B1 * | 4/2005 | Kallenberger | .......... | B60R 7/046 296/37.1 |
| 7,121,611 B2 * | 10/2006 | Hirotani | ................ | B60J 5/0451 280/751 |
| 8,210,590 B1 * | 7/2012 | Moberg | ................ | B60J 5/042 224/544 |
| 8,888,189 B2 * | 11/2014 | Tamura | ................ | B60N 2/0232 297/112 |
| 2002/0060481 A1 * | 5/2002 | Jones | ................ | B60N 2/206 297/188.04 |
| 2002/0125734 A1 * | 9/2002 | Pokorzynski | ....... | B29C 44/1257 296/146.7 |
| 2005/0017036 A1 * | 1/2005 | Dahl | ................ | B60N 3/108 224/275 |
| 2005/0218170 A1 * | 10/2005 | Allmond | ................ | B60R 7/046 224/542 |
| 2005/0284907 A1 * | 12/2005 | Kaiser | ................ | B60R 7/046 224/543 |
| 2006/0012205 A1 * | 1/2006 | Radu | ................ | B60R 7/046 296/37.13 |
| 2006/0062006 A1 * | 3/2006 | Radu | ................ | B29C 45/0017 362/488 |
| 2006/0097534 A1 * | 5/2006 | Adams | ................ | B60R 7/06 296/37.1 |
| 2006/0220414 A1 * | 10/2006 | Boyer | ................ | B60R 13/02 296/146.7 |
| 2006/0266779 A1 * | 11/2006 | Mozer | ................ | B60N 3/007 224/543 |
| 2011/0109114 A1 * | 5/2011 | Kolpasky | ................ | B60N 2/01 296/65.13 |
| 2015/0274069 A1 * | 10/2015 | Cuddihy | ................ | B60Q 3/022 315/77 |
| 2016/0339862 A1 * | 11/2016 | Deng | ................ | B60R 21/0428 |

* cited by examiner

VEHICLE COMPRISING A UTILITY SPACE

CROSS-REFERENCE TO RELATED APPLICATIONS

This application claims foreign priority benefits under 35 U.S.C. §119(a)-(d) to European patent application number EP 15162219.8, filed Apr. 1, 2015, which is incorporated by reference in its entirety.

TECHNICAL FIELD

Vehicle comprising a front seat section and a rear seat section, wherein the front seat section comprises a driver's seat and a utility space located at the side of the driver's seat, the rear seat section comprises multiple seats and rear doors on either side of the rear seat section.

BACKGROUND

In the luxury market for vehicles a number of options for improving a passenger's experience of traveling in the vehicle are available. Experiences can for instance be access to food, drinks, services and/or entertainment, each of which can be provided in various compartments or by technical equipment in the vehicle. Examples of where these compartments and equipment are located are in the back of the front seats or in the luggage compartment from where the compartment may be accessible from within the passenger compartment.

A problem with today's solutions is that few spaces of the inside of the vehicle are left to use for providing the above mentioned experiences. Although it could be possible to increase the size of the vehicle in order to increase the space within the passenger compartment this would require redesigns and customization and lead to increasing the cost of the vehicle.

There is thus a need for an improvement in the way passenger experience is provided.

SUMMARY

An object of the present disclosure is to provide an inventive vehicle comprising a front seat section and a rear seat section, wherein the front seat section comprises a driver's seat and a utility space located at the side of the driver's seat.

The disclosure relates to a vehicle comprising a front seat section and a rear seat section. The front seat section comprises a driver's seat and a utility space located at the side of the driver's seat. The rear seat section comprises multiple seats and rear doors on either side of the rear seat section. The front seat section comprises a single front door comprising a front door surface at the side of the front seat section adjacent to the driver's seat, and at least a part of a fixed surface element located at the opposite side of the front seat section facing towards the front door surface of the single front door. The utility space comprises the fixed surface element and the utility space is accessible to a person sitting in the rear seat section.

The vehicle comprises a driver side and a passenger side in the length direction of the vehicle. The driver side is the side of the vehicle where the driver seat is positioned. A passenger sitting in the rear seat section behind the driver seat is thus sitting in the driver side. The passenger side is the side of the vehicle beside the driver side. Normally, a front passenger seat would be installed in the front seat section. The passenger sitting in the rear seat section beside the passenger in the driver side is sitting in the passenger side of the vehicle. Doors and interior details are also attributable to the driver and the passenger side. In this application, the rear seat passenger is the passenger sitting in the rear seat section in the passenger side.

The disclosure takes advantage of the space created by removing both the front passenger seat and the front door on the passenger side. This creates a space in front of the rear seat passenger in the rear seat on the passenger side of the vehicle. Further, by removing the front door and installing a fixed surface element in the place where the car door panel or door card normally would be installed, additional space is created that is accessible by the rear seat passenger. With utility space is meant a space in the passenger compartment wherein one or more utility functions can be installed, for instance on the fixed surface element.

The utility functions are all available to the rear seat passenger. The disclosure aims at creating a space for the rear seat passenger which feels more like a living environment than the interior of a vehicle. For instance, removing the front door improves the dampening as there are fewer openings for sound to enter the passenger compartment. The improved dampening can be used to improve the acoustic experience for the rear seat passenger and create a more theatre-like experience. Removing the front passenger seat improves the vision out of the car for the rear seat passenger.

The utility space may comprise at least one utility function. The utility function is accessible by the person sitting in the rear seat section. The utility space is designed such that all utility functions located within the utility space are accessible by the rear seat passenger, either directly or indirectly. With indirectly is meant that they are accessible by means of for instance a remote control.

The utility function may be one or more of: Refrigerator, microwave oven, heated storage, glassware storage, ice tray, foot rest, catering module, glass holder, vase holder or entertainment system.

The fixed surface element may comprise at least one utility function. The utility function of the fixed surface element is accessible by the person sitting in the rear seat section. By removing the front door, the area where the door card or door panel would normally be installed to cover the door's internal components, a much larger element can be installed due to that the space needed for the internal component of the front door can be used for utility functions. The fixed element thereby adds to the utility space available for the rear seat passenger. The fixed surface element can also be used to improve the theatre-like experience for the rear seat passenger as there is more space to add speakers which are directed only towards improving the sound for the rear seat passenger.

The fixed surface element of the utility space may comprise a horizontal first inner surface. The first inner surface comprises at least one utility function, wherein the utility function is accessible by the person sitting in the rear seat section. The larger fixed surface element allows for the installation of for instance a kitchenette or a counter top on the first inner surface. When the utility function is the ice tray, it may be built-in into the first surface.

The first inner surface may form a continuous surface with the armrest of the rear door located at the same side of the vehicle as the fixed surface element. One example is that the counter-top extends all the way from the front of the passenger compartment to the rear passenger side door armrest. This further enhances the experience for the rear seat passenger that he or she is sitting in their own living room-like space.

The fixed surface element of the utility space may comprise a horizontal second inner surface located below the first inner surface, wherein the second inner surface comprises a storage surface. The fixed surface element may comprise a horizontal surface for a briefcase, suitcase and duffel bag or similar. The second inner surface is preferably located towards the front of the passenger compartment, such that the space beneath the instrument panel can be utilized to create a compartment with the second inner surface.

BRIEF DESCRIPTION OF THE DRAWINGS

The various aspects of embodiments herein, including its particular features and advantages, will be readily understood from the following detailed description and the attached drawings.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
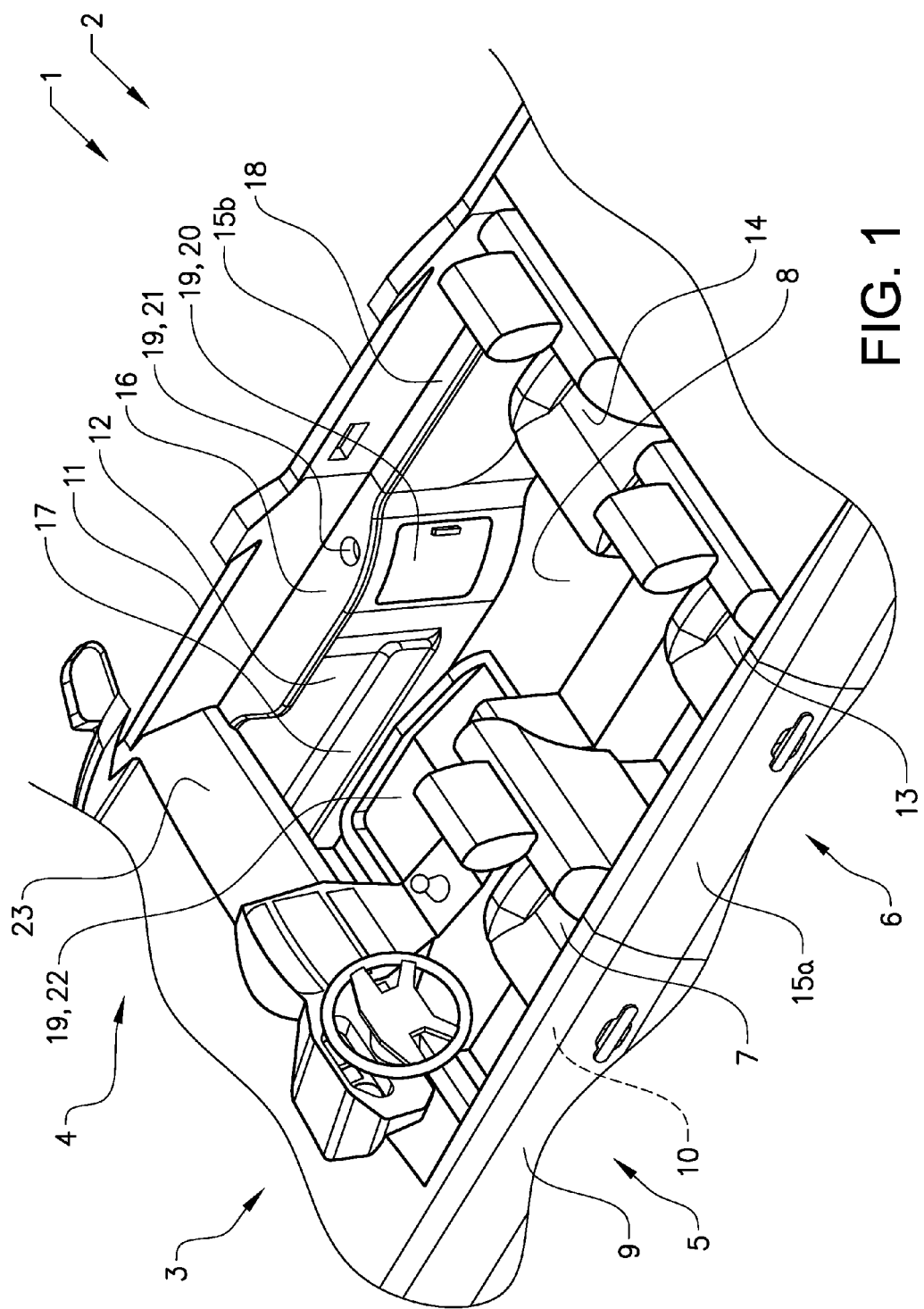
FIG. 1 schematically shows a vehicle according to a first example.

FIG. 1 schematically shows a passenger compartment 1 of a vehicle 2 according to a first example. For illustrative purposes the A, B and C pillars have been removed. The vehicle 2 has a longitudinal extension, i.e., front to back; and a transverse extension, i.e., the extension from one longitudinal side of the vehicle 2 across to the opposing side. The vehicle 2 comprises a passenger compartment 1 comprising a driver side 3 and a passenger side 4 arranged beside each other along the longitudinal direction of the passenger compartment 1. The passenger compartment 1 further comprises a front seat section 5 and a rear seat section 6 located behind the front seat section 5 in the longitudinal direction. The front seat section 5 and the rear seat section 6 each have a transverse extension.

The front seat section 5 comprises a driver seat 7 and a utility space 8 located beside the driver seat 7. The front seat section 5 further comprises a single front door 9 located adjacent the driver seat 7 for the driver to enter and exit the vehicle 2, i.e., the front seat section 5 comprises only a driver side front door. The single front door 9 comprises a front door surface 10 facing the passenger compartment 1. The front seat section 5 further comprises a body panel 11 replacing the front passenger side door. On the inside of the body panel 11 a fixed surface element 12 is mounted. The fixed surface element 12 replaces the door card of a front door on the passenger side 4 of the front seat section 5, which would normally cover the front passenger door interior. The fixed surface element 12 faces the passenger compartment 1 and a part of the fixed surface element 12 faces the front door surface 10 on the opposite side of the front seat section 5 and parts of the fixed surface element 12 faces the passenger compartment 1. The rear seat section 6 comprises a first rear seat 13 placed behind the driver seat 7 and a second rear seat 14 placed on the passenger side 4. The rear seat section 6 comprises rear doors 15a, 15b on either side of the rear seat section 6.

The fixed surface element 12 comprises a first inner surface 16 and a second inner surface 17 below the first inner surface 16. The first inner surface 16 is in the first example a counter top. In another example, at least part of the counter top could be exchanged for a kitchenette. In the first example the counter top has an extension such that it forms a continuous surface with an armrest 18 of the rear door 15b of the passenger side 4, when the rear door 15b is closed.

The utility space 8 is aimed at serving the rear seat passenger, i.e., the passenger in the rear seat section 6 sitting on the passenger side 4 of the vehicle 2 and comprises at least one utility function 19. In the example of FIG. 1, the utility functions 19 of utility space 8 comprises a refrigerator 20 and a glass holder 21 located in the fixed surface element 12 and a foot rest 22 located in the utility space 8 placed beneath the instrument panel 23. The refrigerator 20 may be replaced by or incorporated with a glassware storage for holding and preparing drinks. With glassware is meant e.g., drinkware, tumblers, stemware, pitchers as well as vases. The glass holder 21 is preferably a depression in the first inner surface 16 with a size and shape suitable to fit the glasses of the glassware in the vehicle 2. The first inner surface 16 may further comprise a vase holder (not shown) in front of the glass holder 21 in the form of a depression. The depression can for instance be round, oval or square. The vase holder further adds to the possibilities to make the utility space feel like a living room. The foot rest 22 is moveable such that its position in the utility space can be adapted to suit the height of the rear seat passenger. The utility space 8 may further comprise an entertainment or infotainment system (not shown). The entertainment or infotainment system may comprise a display, one or more speakers and an interface for the rear seat passenger to access the system. The interface may for instance be a wired or wireless remote control or a keyboard.

Figure 2:
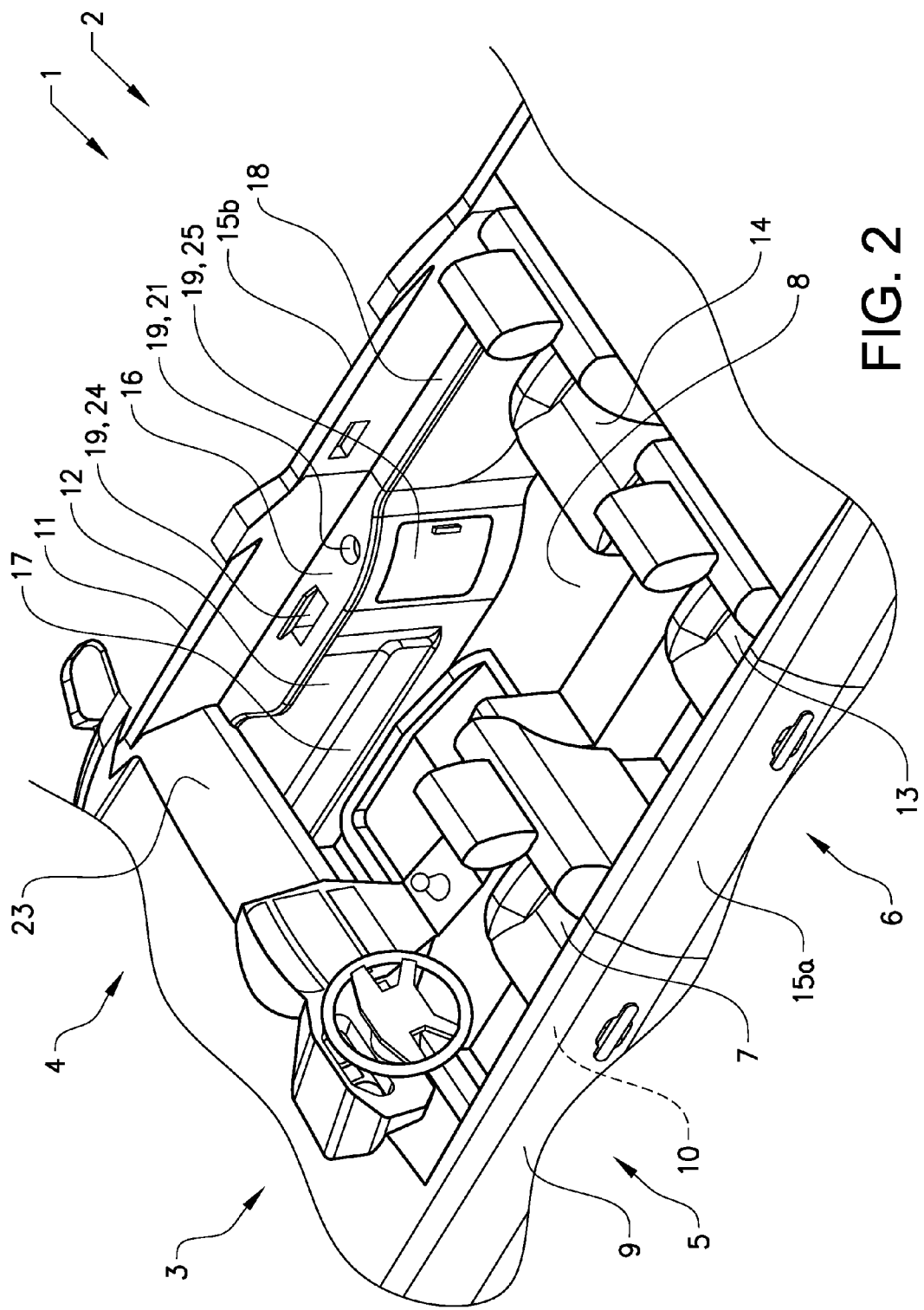
FIG. 2 schematically shows a vehicle according to a second example.

FIG. 2 schematically shows a vehicle 2 according to a second example. In the second example the utility space 8 comprises an ice tray 24 built into the fixed surface element 12, which can be accessed through an opening in the first inner surface 16. The utility space 8 in the second example comprises a heated storage 25 for keeping food and/or drinks warm instead of the refrigerator 20 in FIG. 1.

Figure 3:
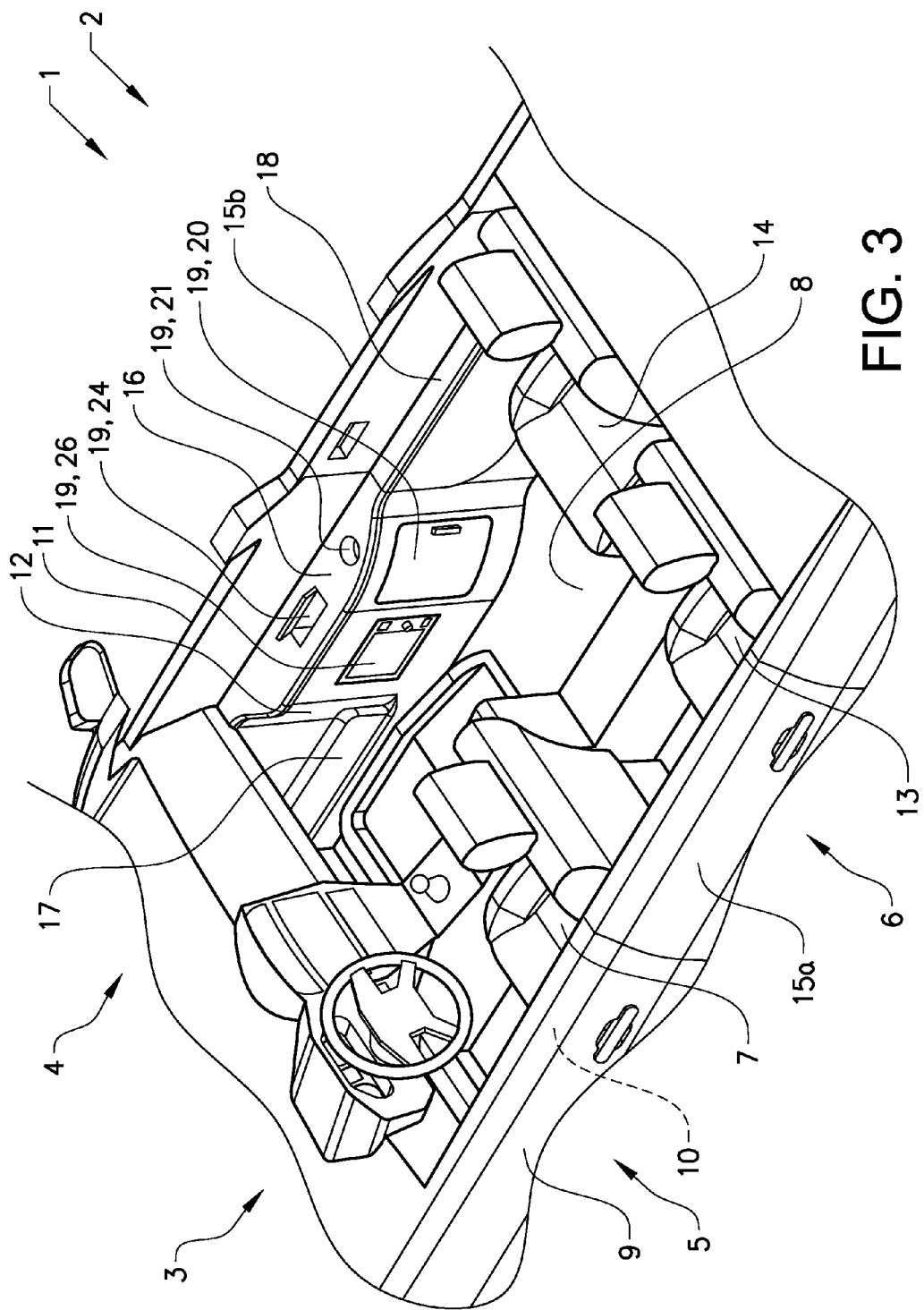
FIG. 3 schematically shows a vehicle according to a third example.

FIG. 3 schematically shows a vehicle 2 according to a third example. In the third example the utility space 8 comprises both a refrigerator 20 and a microwave 26 for heating food and/or drinks. In the third example, the second inner surface 17 is shortened compared to the first and second examples in order to make room for the microwave 26. Like in FIG. 2, the refrigerator 20 can be replaced by a heated storage 25.

It is to be understood from the disclosure that the utility space 8 may comprise additional utility functions that may be of use for a rear seat passenger. For instance, the foot rest may be replaced by a catering module which in itself may comprise a number of utility functions besides a foot rest. In another example the fixed surface element 12 may extend upwards over the front passenger side window, further increasing the utility space and locations for utility functions.

Reference signs mentioned in the claims should not be seen as limiting the extent of the matter protected by the claims, and their sole function is to make claims easier to understand.

As will be realized, the disclosure is capable of modification in various obvious respects, all without departing from the scope of the appended claims. Accordingly, the drawings and the description are to be regarded as illustrative in nature, and not restrictive.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A vehicle comprising:
a front seat section including a driver seat, a utility space located at a side of the driver seat, a single front door comprising a front door surface at a first side of the front seat section adjacent the driver seat, and at least a part of a fixed surface element located at an opposite second side of the front seat section that faces toward the front door surface of the single front door; and
a rear seat section including multiple seats and multiple rear doors, the multiple rear doors including a first rear door on a first side of the rear seat section and a second rear door on a second side of the rear seat section; wherein the utility space comprises the at least a part of the fixed surface element and the utility space is accessible to a person sitting in the rear seat section.

2. The vehicle according to claim 1 wherein the utility space comprises at least one utility function that is accessible to the person sitting in the rear seat section.

3. The vehicle according to claim 2 wherein the utility function comprises one or more of: a refrigerator, a microwave oven, a heated storage, a glassware storage, an ice tray, a foot rest, a catering module, a glass holder, a vase holder, or entertainment/infotainment system.

4. The vehicle according to claim 1 wherein the fixed surface element comprises at least one utility function that is accessible to the person sitting in the rear seat section.

5. The vehicle according to claim 1 wherein the fixed surface element comprises a first horizontal inner surface.

6. The vehicle according to claim 5 wherein the first inner surface comprises at least one utility function that is accessible to the person sitting in the rear seat section.

7. The vehicle according to claim 6 wherein the utility function comprises an ice tray built into the first inner surface.

8. The vehicle according to claim 5 wherein the second rear door is located at a same side of the vehicle as the fixed surface element, and wherein the first inner surface forms a continuous horizontal surface with an armrest of the second rear door.

9. The vehicle according to claim 5 wherein the fixed surface element comprises a horizontal second inner surface located below the first inner surface, and the second inner surface comprises a storage surface.

* * * * *